Figure 3:
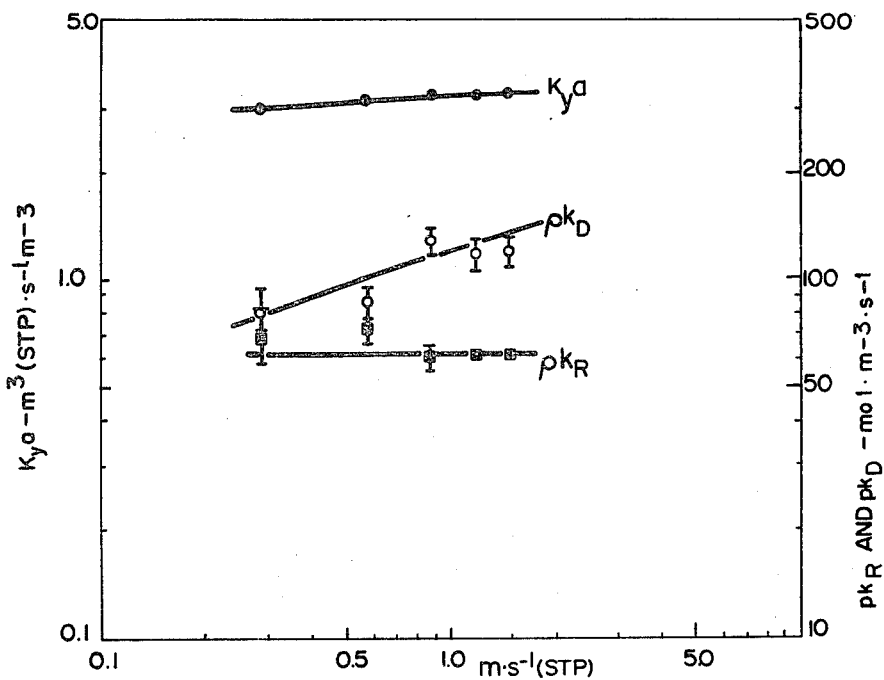

United States Patent [19]

den Hartog et al.

[11] Patent Number: 4,471,014
[45] Date of Patent: Sep. 11, 1984

[54] ORDERED BED PACKING MODULE

[75] Inventors: James den Hartog; John P. Butler, both of Deep River; Fred W. R. Molson, Petawawa, all of Canada

[73] Assignee: Atomic Energy of Canada Limited, Ottawa, Canada

[21] Appl. No.: 363,304

[22] Filed: Mar. 29, 1982

[51] Int. Cl.³ .............................................. B32B 3/28
[52] U.S. Cl. ........................... 428/182; 261/DIG. 72; 423/580; 428/186; 428/192; 428/906
[58] Field of Search ............... 428/182, 184, 186, 906, 428/192; 261/DIG. 72, 95; 203/DIG. 6; 423/580

[56] References Cited

U.S. PATENT DOCUMENTS

| | | | |
|---|---|---|---|
| 3,466,151 | 9/1969 | Sicard et al. | 261/95 |
| 3,785,620 | 1/1974 | Huber | 261/DIG. 72 |
| 3,888,974 | 6/1975 | Stevens | 423/580 |
| 4,025,560 | 5/1977 | Rolston et al. | 423/580 |
| 4,126,667 | 11/1978 | Butler et al. | 423/580 |

Primary Examiner—Paul J. Thibodeau
Attorney, Agent, or Firm—Francis W. Lemon

[57] ABSTRACT

In one embodiment of the invention a catalyst packing module is provided which greatly enhances the vapour-liquid transfer rate in the overall hydrogen-liquid water isotopic exchange reaction between streams of gaseous hydrogen and liquid water. The catalyst packing module comprises alternate layers of plane sheet and corrugated sheet and is produced by rolling at least one plane sheet and at least one corrugated sheet together into a right cylinder in a jelly roll configuration. The plane sheet is a woven, knitted or felted cloth of a textile material which wicks water over its surface and the corrugated sheet is an open mesh of metal coated with a porous matrix of polytetrafluoroethylene with exposed, partially platinized carbon particles therein. This catalyst packing module maximizes the hydrophilic surface area per unit volume of packing for the vapour-liquid transfer reaction and also the surface area of the support material (carrier) for the hydrophobic catalyst. Although the packing is tight, high gas and liquid flow can be used without flooding the bed because the hydrophilic surfaces are separated by hydrophobic spacers and because the hydrophilic surface have a wicking action. In other embodiments of the invention the packing module is used to advantage for any gas-liquid transfer reaction but in this application the corrugated mesh is a metal cloth, does not support a catalyst and is made hydrophobic with, or of, some suitable polymeric material such as polytetrafluoroethylene, polyethylene, polystyrene, polymethacrylate, polypropylene etc.

7 Claims, 7 Drawing Figures

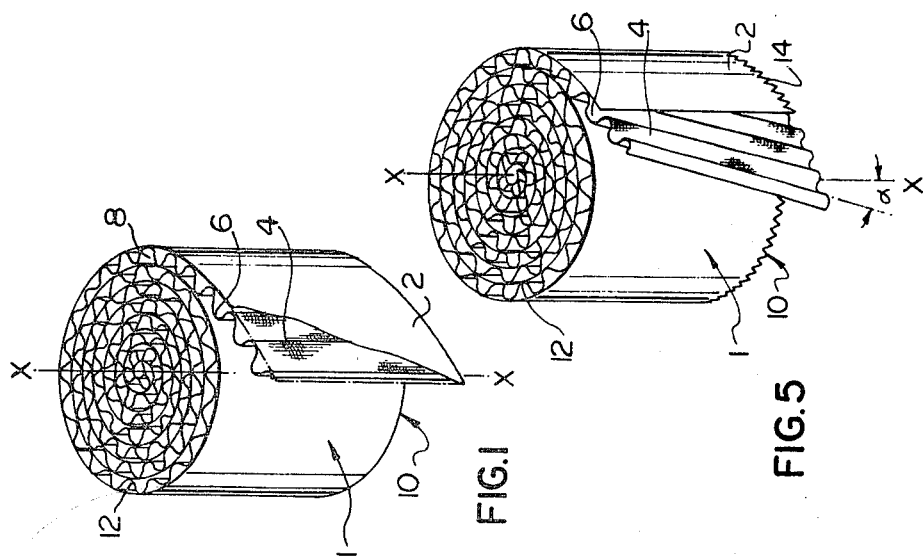
FIG. 2
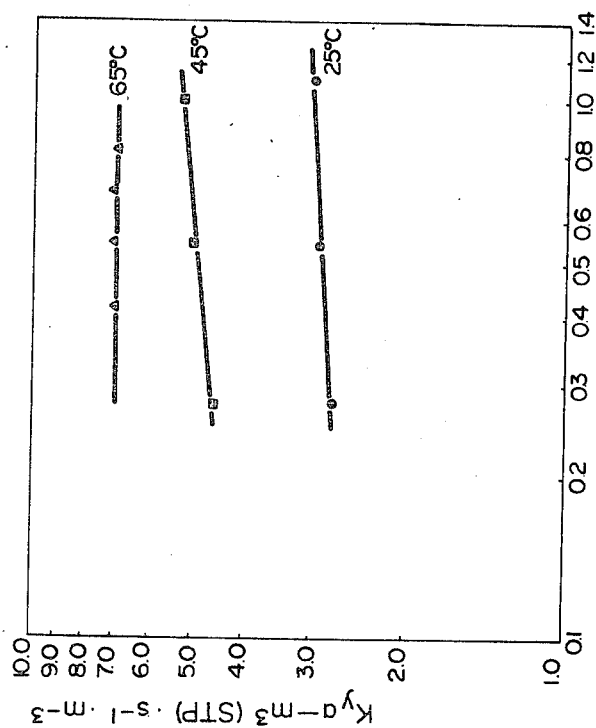
FIG. 1
FIG. 5

ORDERED BED PACKING MODULE

This invention relates to an ordered bed packing module for gas-liquid transfer reactions.

This invention particularly relates to a packing module which greatly enhances the contacting of a gas and liquid in a packed column, with some embodiments having particular application to the hydrogen/liquid water isotopic exchange reaction, and which employs an inherently hydrophobic catalyst in the packing element.

U.S. Pat. No. 3,888,974, dated June 10, 1975, by W. H. Stevens is directed to the problem of providing a bithermal process for hydrogen isotope exchange between gaseous hydrogen and liquid water using a catalytically active metal and wherein deactivation of the catalytically active metal by liquid water is retarded. This Stevens' process uses a catalyst provided with a substantially liquid-water-repellent organic resin or polymer coating, which is permeable to water vapour and hydrogen gas, and the overall catalytic exchange of isotopes between streams of hydrogen and liquid water primarily occurs by a two-step exchange process with the following simultaneous reactions being closely coupled in space, Reaction 1

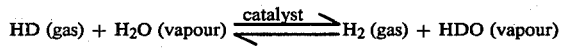

Reaction 2

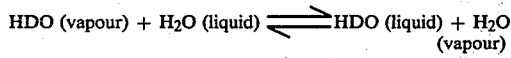

While the process of the Stevens' patent is undoubtedly a great improvement in retarding the deactivation of the catalytically active metal by contact with the liquid water stream, there remains a need to further retard the deactivation of the catalytically active metal by contact with liquid water and at the same time to increase the rate of hydrogen isotope exchange and thus provide a more economical process.

U.S. Pat. No. 4,025,560, dated May 24, 1977, J. H. Rolston, W. H. Stevens, J. P. Butler and J. den Hartog discloses a similar process to that described in the Stevens' patent but wherein deactivation of the catalytically active metal is retarded while at the same time a greater rate of hydrogen isotope exchange is achieved. In this Rolston et al process at least one catalyst assembly is used having a metallic catalyst consisting of at least one Group VIII metal, deposited in the pores of a porous, inherently hydrophobic support. The porous, inherently hydrophobic support substantially prevents the catalyst from being contacted by the liquid water stream while allowing hydrogen gas and water vapour to radidly contact the catalyst, whereby even though streams of liquid water and hydrogen gas are brought into contact with each other in the presence of the catalyst assembly, the exchange occurs primarily by the two steps mentioned above in the Stevens' patent but with a slower rate of deactivation of the catalytically active metal.

The research for the Stevens' and Rolston et al processes had been directed to improving the casing around the catalytically active metal so that there was better contact between the hydrogen gas, water vapour and catalyst, thus increasing the rate of hydrogen isotope exchange between the hydrogen gas and water vapour. A problem still remained, however, in that the overall rate of hydrogen isotope exchange in a packed catalyst bed assembly was limited by the hydrogen gas/water vapour exchange or the water vapour/liquid water exchange depending upon which exchange is proceeding at the slower rate. Thus even though the Rolston et al process may increase the rate of hydrogen isotope exchange from the hydrogen gas to water vapour, the packed catalyst bed assembly of the Rolston et al process could not make full use of this increased exchange rate because the water vapour/liquid water exchange rate was limiting the overall exchange rate between hydrogen gas and liquid water.

It has already been proposed in U.S. Pat. No. 4,126,667, dated Nov. 21, 1978, J. P. Butler, J. den Hartog and F. W. R. Molson that higher overall hydrogen isotope exchange rates can be achieved when the catalyst packed bed consists of a hydrophobic catalyst structure and a hydrophilic packing structure. The hydrophilic packing structure is interspersed with the hydrophobic catalyst structure. This arrangement increases the overall isotopic exchange rate between hydrogen and liquid water. The addition of hydrophilic surfaces into the packed bed increases the exchange rate of hydrogen isotopes between water vapour and liquid water because the contact surface area is increased so that the overall exchange rate between gaseous hydrogen and liquid water in the two-step exchange process taught by W. H. Stevens is not retarded by the exchange rate between water vapour and liquid water.

While the Butler et al. packing arrangement has proven to increase the overall exchange rate, experiments have shown that this exchange rate is still limited to some extent by the water vapour/liquid water exchange reaction (reaction 2). There is still a need to increase the rate of this latter reaction by increasing the contact surface area between the water vapour and liquid water and to make this surface area as hydrophilic as possible. Further while increasing the surface area of the hydrophilic packing it is necessary not to restrict the countercurrent flow of liquid and gas throughout the packing unit so that high gas and liquid flow rates can be used without flooding the packed column.

According to the present invention there is provided an ordered packing module for gas-liquid transfer reactions, comprising alternate layers of plane and corrugated sheets coiled together to form a roll, with the corrugations extending along an axis about which the layers have been coiled together and providing unobstructed fluid passages between the plane and corrugated sheets, and wherein the plane sheet comprises woven, knitted or felted cloth of a textile, wicking material which will provide an uninterrupted wicking path between the ends of the roll, for the said liquid, and the corrugated sheet comprises an open mesh material with at least an outer surface layer consisting of a high molecular weight, organic, polymeric substance which will be inherently hydrophobic with respect to the said liquid.

Further, according to the present invention there is provided an ordered bed catalytic packing module for the combination of both catalytic and gas-liquid transfer reactions, comprising alternate layers of plane and corrugated sheet coiled together to form a roll, with the corrugations extending along an axis about which the layers have been coiled together and providing unobstructed fluid passages between the plane and corrugated sheets and wherein the plane sheet is of a woven, knitted felted cloth of a textile, wicking material which will provide an uninterrupted wicking path, between the ends of the roll, for the said liquid and which will be substantially catalytically inactive with respect to the said gas and the said liquid, and the corrugated sheet comprises an open mesh carrier, and an outer surface layer on the mesh, the outer surface layer comprising a high molecular weight, organic, polymeric substance which will be inherently hydrophobic with respect to the said liquid, and catalyst crystallites of at least one element selected from Group VIII of the Periodic Table, the crystallites being dispersed in the porous matrix and partially enclosed thereby so that the porous matrix will substantially inhibit the contact of liquid water with the crystallites while allowing contact therewith of the said gas and the said liquid in vapour form.

In some embodiments of the present invention the high molecular weight, organic, polymeric substance is polytetrafluoroethylene and the catalyst consists of platinum crystallites supported on high surface area carbon particles and these partially platinized carbon particles are dispersed in the porous matrix.

In other embodiments of the present invention the corrugations extend along paths which are inclined downwardly at some acute angle, α, to the left of the central vertical plane of the module and wherein alternate modules in the packed column have the corrugations inclined downwardly at the same angle α to the right of the central vertical plane of the module so that the unobstructed fluid passages extend downwardly in a zig-zag fashion.

In other embodiments of the present invention the hydrophilic plane strip is of a material selected from the group consisting of cotton and fibreglass.

In other embodiments of the present invention the corrugated sheet is one of a plurality of similar corrugated sheets placed side by side and coiled with a single plane hydrophilic sheet so that the whole of the band width of the plane sheet has a number of corrugated sheet coiled therewith.

In other embodiments of the present invention the plane sheet is one of a plurality of similar plane hydrophilic sheets coiled with successive band widths of the corrugated sheet, and with adjacent plane sheets having marginal, overlapping edge portions.

Figure 4:
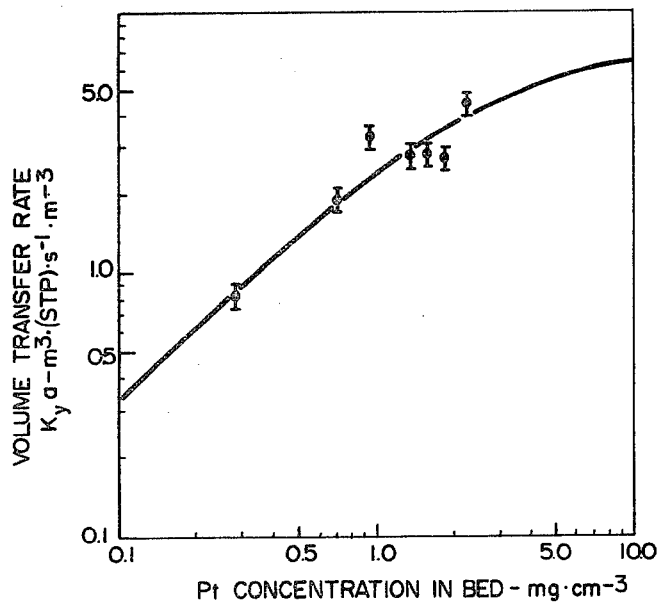
Figure 7:
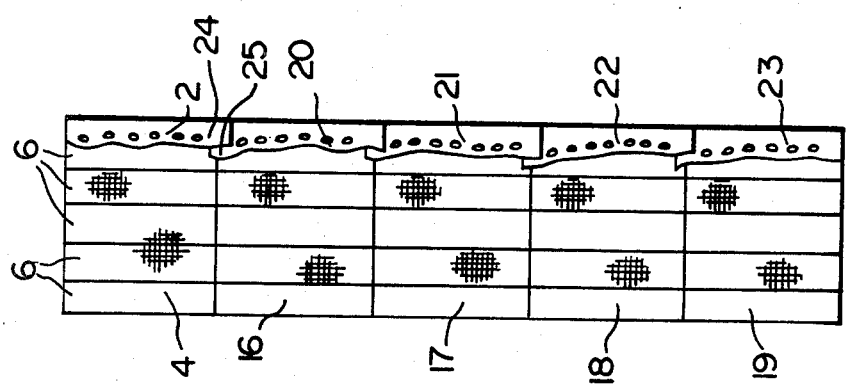
Figure 6:
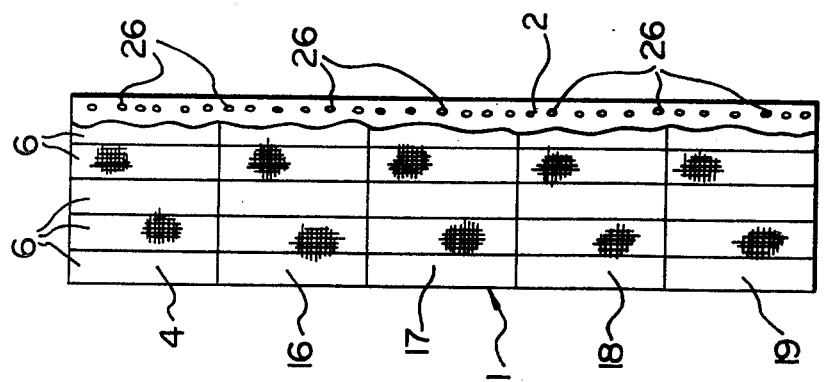

In the accompanying drawings which illustrate, by way of example, embodiments of the present invention:

FIG. 1 is a perspective view of an ordered bed packing module for gas-liquid transfer reactions alone or for the combination of both catalytic and gas-liquid transfer reactions. The module is particularly useful for contacting hydrogen gas and liquid water for hydrogen isotope exchange, FIG. 2 is a graph showing the volume transfer rate, $K_v a$, plotted against the gas flow rate at various temperatures for packing modules of the type shown in FIG. 1 used for hydrogen isotope exchange between gaseous hydrogen and liquid water, FIG. 3 is a graph showing the catalytic and vapour-liquid transfer rates and the overall transfer rate for an ordered bed packing module of the type shown in FIG. 1, for hydrogen isotope exchange between gaseous hydrogen and liquid water, FIG. 4 is a graph showing the activities of catalysts, with various platinum loadings, in an ordered bed packing module of the type shown in FIG. 1, for hydrogen isotope exchange between gaseous hydrogen and liquid water, FIG. 5 is a perspective view of a different ordered bed packing module for gas liquid transfer reactions alone or for the combination of both catalytic and gas-liquid transfer reactions, to that shown in FIG. 1, and which is particularly useful for contacting hydrogen gas and liquid water for hydrogen isotope exchange, and FIGS. 6 and 7 are side views of different ordered bed packing modules for gas-liquid transfer reactions alone or for the combination of both catalytic and gas-liquid transfer reactions, to that shown in FIGS. 1 and 5, and which are also particularly useful for contacting hydrogen gas and liquid water for hydrogen isotope exchange.

In FIG. 1 there is shown an ordered bed packing module for gas-liquid transfer reactions, generally designated 1, comprising alternate layers of plane and corrugated sheets, designated 2 and 4 respectively, coiled together to form a roll, with the corrugations such as 6, extending along an axis XX about which the layers 2 and 4 have been coiled together and providing unobstructed fluid passages, such as 8, between the plane and corrugated sheet 2 and 4 respectively, and wherein the plane sheet 2 comprises a woven felted cloth of a textile, wicking material which will provide an uninterrupted wicking path, between the ends of the roll, for the said liquid, and the corrugated sheet 4, comprises an open mesh material with at least an outer surface layer consisting of a high molecular weight, organic polymeric substance which will be inherently hydrophobic with respect to the said liquid.

In this embodiment the end faces 10 and 12 are substantially at right angles to the axis XX. In order for the gas-liquid transfer reaction packing module 1 to be used for hydrogen isotope exchange between gaseous hydrogen and liquid water, the plane sheet 2 is of a textile material which will be substantially catalytically inactive with respect to the said gas and the said liquid and the corrugated sheet 4 comprises an open mesh carrier, and an outer surface layer on the mesh, the outer surface layer comprising a porous matrix of a high molecular weight, organic, polymeric substance in the form of polytetrafluoroethylene (marketed under the trademark Teflon) which will be inherently hydrophobic (water repellant) with respect to the liquid water, and catalyst crystallites of at least one element selected from Group VIII of the Periodic Table, in this instance platinum crystallites, the crystallites being dispersed in the porous matrix and partially enclosed thereby so that the porous matrix will substantially inhibit the contact of liquid water with the crystallites while allowing contact therewith of the hydrogen gas and water vapour.

Furthermore, in this embodiment the platinum crystallites are provided by high surface area partially platinized carbon particles dispersed in the porous polytetrafluoroethylene matrix.

Tests to verify the present invention have been carried out using Pt-C-Teflon catalyst deposited on stainless steel open mesh cloth (20×20 mesh). The catalyst was prepared by painting an aqueous emulsion of platinized carbon powder and Teflon onto the open mesh cloth, using Triton (trademark) as an emulsifying agent. Catalysts were also prepared by electrostatically spraying the dispersion onto the open mesh cloth using multiple coats, with infrared heat lamp drying between applications. The resulting catalysts were slowly dried in air or under vacuum over an extended period at gradually increasing temperatures from 60° to 200° C. to remove the emulsifying agent. The catalyst was then cured, or sintered, by heating in air at 365° C. for a few minutes.

MEASUREMENT OF CATALYST ACTIVITY

Catalyst activities for the hydrogen isotopic exchange reaction between hydrogen gas and liquid water were measured in a trickle bed reactor. The catalyst modules were packed in a glass column of cross sectional area about 500 mm² to a bed depth of 0.1 to 0.3 m. Provisions were made to contact the packed catalyst bed with an upward flow of purified hydrogen enriched in deuterium (D/H≃300 ppm) and with natural liquid water (D/H=144 ppm) which was trickled downward throgh the catalyst bed. The hydrogen gas was first passed upward through a humidifier consisting of a column packed with non-catalytic 6.1 mm diameter rough ceramic spheres, in which the effluent water from the catalyst bed flows downward. This arrangement served to saturate the hydrogen gas with the water vapour in isotopic equilibrium with the liquid water flowing from the bottom of the catalyst bed.

The activity of these ordered bed catalytic packing modules for the hydrogen-water isotopic exchange reaction was evaluated from the known deuterium concentration in the water entering the top of the column and by measuring the decrease in the deuterium content of the hydrogen gas stream, free of water vapour, after its passage through the catalyst bed. Because these modules are more active than catalysts previously described, the deuterium content of the liquid water changes significantly over the length of the catalyst bed even in these small test columns. Thus the previously employed approximation of the deuterium content of the hydrogen in equilibrium with the water being constant over the length of the catalyst bed is now not valid. This results in a somewhat more complicated expression for calculating the activity of the catalyst.

The activity of the catalyst is conveniently expressed in terms of the overall gas-phase volume transfer rate, $K_y a$, which defines the net amount of deuterium transferred from an isotopically enriched hydrogen stream to liquid water in a unit volume of packed catalyst bed under conditions of unit displacement from isotopic equilibrium. The volume transfer rate, $K_y a$, is expressed as cubic meters of HD at STP per second per cubic meter of catalyst bed, m³(STP)·s⁻¹·m⁻³ (bed), and is evaluated from the relation $$K_y a = \frac{F_{H_2} \cdot A}{V} \cdot NTU \quad (1)$$

In equation (1), $F_{H_2}$ is the superficial flow of hydrogen in m·s⁻¹ measured at STP, (273.15K and one atmosphere, 101.325 kPa), A is the cross sectional area of the column in square meters, V is the volume of the catalyst bed assembly in cubic meters and NTU is the number of transfer units in the bed.

The number of transfer units is related to the changes in the deuterium concentration of the hydrogen over the length of the column and the mole ratio of the water to the hydrogen gas flow rate, L/G. For low deuterium concentrations (<10%) the number of transfer units is calculated from the equation.

$$NTU = \frac{1}{1-J} \ln\left[(1-J)\left(\frac{y_b - y_t^*}{y_t - y_t^*}\right) + J\right] \quad (2)$$

where $$J = \frac{1}{\alpha} \cdot \frac{1}{L/G} = \frac{1}{\alpha} \cdot \frac{G}{L} \quad (3)$$

and the y terms are the atom fractions of deuterium in the hydrogen gas. The subscripts t and b refere to the top and bottom of the exchange column, and the superscript (*) denotes the deuterium concentration in the hydrogen in equilibrium with the water. The value of y* is evaluated from the exact relation $$y^* = \frac{X}{\alpha - X(\alpha - 1)} \quad (4)$$

where X is the atom fraction of deuterium in the water and $\alpha$ is the equilibrium isotopic separation factor given by the equation:

$$\alpha = \frac{[D/H]_{H_2O, \text{ liquid}}}{[D/H]_{H_2, \text{ gas}}} = \frac{X}{Y} \cdot \frac{(1-y)}{(1-X)} \quad (5)$$

The number of transfer units may also be calculated from the relationship $$NTU = \frac{y_b - y_t}{(y_b - y_b^*) - (y_t - y_t^*)} \cdot \ln\left[\frac{y_b - y_b^*}{y_t - y_t^*}\right] \quad (6)$$

the quantity $y_b^*$ is calculated from $X_b$ using equation (4) and $X_b$ is obtained from a deuterium material balance over the catalyst column $$X_b = X_t + L/G(y_b - y_t) \quad (7)$$

These relationships for NTU are still in approximation in that they assume a deuterium mass balance between the water and hydrogen streams and neglect the flow of water vapour in the gas stream. However, at low humidities the error is small, and for short laboratory columns (less than 0.5 m) operating at 25° C. the error is <1%.

PERFORMANCE OF ORDERED BED CATALYSTS

(a) Ordered Bed Arrangements

The catalyst was used in two different ordered bed arrangements for the exchange of deuterium between streams of gaseous hydrogen and liquid water:
(1) the catalyst on flat, stainless steel open mesh cloth (mesh 20×28, wire diameter 0.0075 inches or 0.1905 mm) and a hydrophilic packing, phosphatized cross-corrugated mild steel foil, were rolled together with a right cylinder (like a jelly roll) to form the bed and, as an embodiment of the present invention,
(2) the same catalyst as in (1) above was corrugated, 4, and rolled with a cotton cloth, as the plane strip, 2, into a right cylinder as shown in FIG. 1.

For both arrangements the resulting ordered beds had a platinum concentration of 3.16 mg Pt/cm³ of bed. The first arrangement had an activity, $K_y a = 1.4$ m³ (STP)·s⁻¹·m³ at a hydrogen gas flow of 0.5 m/s (STP).

The activity increased with the 0.3 power of the hydrogen flow rate which is typical for catalysts where both the catalytic, hydrogen gas/water vapour, and the water vapour/liquid water transfer rates are involved in controlling the overall exchange rate.

The second arrangement had a high activity, $K_ya \times 2.1$ m$^3$(STP)·s$^{-1}$·m$^{-3}$, under the same conditions and the activity was essentially independent of hydrogen gas flow rate. This indicated that the water vapour/liquid water transfer rate was surprisingly high and the overall exchange was being limited primarily by the catalytic rate. A further advantage of the second arrangement was that at one atmosphere the bed could be operated at very high hydrogen gas flow rates, greater than 3 m/s (STP), without flooding of the interstices, such as interstice 8, even with the corresponding higher flow rate of liquid water necessary to maintain a liquid to gas ratio of 1:1. With the first arrangement the bed flooded at about 0.6 m/s (STP). From the tests it is apparent that it is better to have the catalyst, the hydrophobic material, corrugated rather than the hydrophilic surface. When the hydrophilic material is corrugated the very small channel interstices created by the corrugations tend to fill with liquid water thus causing flooding of the bed at low gas velocities. These tests also demonstrate that a much superior catalyst packing module is obtained when the hydrophilic packing is a wicking material such as cotton cloth.

(b) Catalysts on Corrugated Oxidized Stainless Steel Open Mesh Cloth

In view of the high activity obtained with the second arrangement, a number of variations of this type of catalyst were prepared by painting several coats of an aqueous dispersion of platinized carbon powder and Teflon-30 onto corrugated stainless steel, open mesh cloth (20×20 mesh). Wetting agents were removed by heating in vacuum at 200° C. and the catalysts were cured by heating at 365° C. in air, helium or vacuum for about 15 minutes.

One preparation used oxidized stainless steel open mesh cloth in a effort to improve the Teflon bonding. The catalyst was cured by heating in a helium atmosphere to prevent burning of the platinized carbon initiated by the catalytic oxidation of the dispersing agent, Triton. The resulting catalyst had a very low activity $K_ya = 0.1$. On reheating in air to 365° C. for 15 minutes the activity increased to a $K_ya = 0.85$. Apparently heating in air removes contaminants introduced during the preparation. The use of an open cloth of oxidized stainless steel may have been the cause of the low activities because previous work by the applicants with oxidized stainless steel Dixon rings (trademark) exhibited a similar behavior.

(c) Catalysts on Corrugated Stainless Steel Open Mesh Cloth

A second catalyst packing element was prepared on stainless steel open cloth which was cleaned by degreasing with acetone. The catalyst packing element included cotton diaper cloth as the inherently hydrophilic material. The catalyst packing element had a Pt-C-Teflon coating deposited on the stainless steel open mesh cloth and the resulting catalyst contained 0.78 weight % Pt. The activity of the catalyst was measured in a 0.15 m long column with an internal cross-sectional area of 567 mm$^2$. The Pt concentration in the ordered bed was 4.18 mg·cm$^{-3}$. The hydrogen gas pressure in the column was 0.107 MPa and the downward flow of liquid water therein was 2.03 kg·m$^{-2}$·s$^{-1}$.

This catalyst packing element was extremely active and the volume transfer rate $K_ya$, m$^{-3}$(STP)·s$^{-1}$·m$^{-3}$, achieved is shown plotted as a function of the hydrogen gas flow rate m·s$^{-1}$(STP) and for various temperatures, in FIG. 2. The $K_ya$ of this very active catalyst is almost independent of hydrogen gas flow rate. At 25° and 45° C., designated ● and ■ respectively in FIG. 2, $K_ya$ increases as the 0.08 power of the hydrogen flow rate and at 65° C. designated ▲ in FIG. 2, no increase is discernable. This is in contrast to that observed in previous tests for catalysts comprising Pt-C-Teflon on ceramic spheres ($K_ya \approx 1.0$) whose activity increases with the 0.25 to 0.30 power of the gas flow rate. Because the ordered bed catalyst elements are so active, it is difficult to measure the separated rates, with any degree of precision. However, the data show the vapour-liquid transfer rate, $\rho k_D$, to be 3 to 5 times greater then that normally observed for the above mentioned ceramic spheres. The low dependence on gas flow rate suggests that $K_ya$ is being limited primarily by the catalytic rate, $\rho k_R$.

(d) Effect of Different Hydrophilic Packing Materials

Two other catalyst packing modules were prepared with higher catalytically active metal areas and these catalyst packing modules had activities comparable to, or somewhat higher than the data presented in FIG. 2. Various types of woven or felted cloth material for the plain strip 2 were used including, cotton sheeting, Huck towelling, J. Cloth (Trademark) and diaper material in single and double layers. There were only moderate differences among the various hydrophilic packing materials, but the catalyst packing module made with a double layer of diaper material had 30% higher activity, giving $K_ya = 4.1$.

With these catalyst packing modules it was found to be important to have good water distribution at the top of the bed and adequate drainage at the bottom so that water does not back up in the bed.

Most ordered bed, catalytic packing modules according to the present invention, that have lost their catalytic activity can be regenerated completely by heating to 150° C. in air with no adverse effect on column operation. The only exception is J. Cloth* which became somewhat hydrophobic and slightly scorched and for this material the activity was reduced by about 50%.
*Trademark.

(e) Water Distribution in Ordered Beds

Further tests were carried out to study the water flow distribution in a packed ordered bed in a relatively large test column 7.0 cm in diameter and 0.5 m long. The packing modules consisted of Teflon coated corrugated open mesh (28×28) stainless steel cloth rolled together with a layer of cotton cloth into a right cylinder, giving the "jelly roll" configuration. Each packing module was 10 cm long and five such units were packed in the column so water flow from one unit to the next could be investigated. Water passed through the column at a flow rate of 2.61 g·cm$^{-2}$·min$^{-1}$ (0.436 kg·s$^{-1}$·m$^{-2}$) from a water distributor consisting of a slightly dished, corrugated, Teflon coated, stainless steel open mesh (28×28) disc. The water feed from a single pulsed jet impinges on the open mesh disc and the water stream is broken-up into small droplets which shower down onto the column packing in a random manner. Water passing through the packed column appeared to flow evenly from one packing module to the next and water from the lowest module dripped off uniformly over the entire cross sectional area. The drip points were indiscriminate and no preferred points were noted.

To further demonstrate good water distribution throughout the packing, a dye, Malchite Green G (Trademark), was added to the flowing feed water at a concentration of 0.01% by weight. The dye, which is strongly absorbed by cotton, traced the flow of water through the packing. With a total water flow rate of 100 g·min$^{-1}$ it took about 5 minutes for the dye to reach the bottom of the bed (total water hold-up=425 g) and after 10 minutes the column packing was uniformly green. The water containing the dye was passed through the column for a total of 30 minutes followed by a clear water rinse for 5 minutes. Subsequent disassembling of the packing elements showed that the dye was uniformly distributed over the five cotton strips indicating that the water distribution in the individual packing module was quite uniform and the flow of water from one module to the next was also very good. Some undyed sections in the third and fourth module, indicated poorer water distribution, which, although undesirable, only comprised about 7% of the total area of these two strips. The distribution was found to become more uniform in the fifth section.

These tests established that the water distribution in a large diameter column packed with a series of ordered bed packing modules according to the present invention was found to be remarkably uniform.

(f) Catalytic and Vapour-Liquid Transfer Rates

To further demonstrate the superior performance of these ordered catalyst beds the catalytic and vapour-liquid transfer rates, $\rho k_R$ and $\rho k_D$, as well as the overall transfer rate, $K_y a$, were measured simultaneously for packing modules prepared according to the present invention. The separated transfer rates $\rho k_R$ and $\rho k_D$, are the backwards rates for reactions 1 and 2 respectively. These rates were measured and evaluated using the technique and procedures given in detail in the scientific paper "Separation of Rate Processes for Isotopic Exchange Between Hydrogen and Liquid Water in Packed Columns", by J. P. Butler, J. den Hartog, J. W. Goodale and J. H. Rolston given in the Proceedings of the Sixth International Congress on Catalysis, Vol. 2, The Chemical Society, London, 1977, p. 747.

For these measurements, the bed consisted of a Pt-C-Teflon catalyst deposited on corrugated stainless steel open mesh cloth (28×28 mesh) and rolled together with two layers of cotton cloth into a right cylinder giving the "jelly roll" configuration. The catalyst contained 0.78% by weight Pt and the platinum concentration in the packed bed was 4.8 mg Pt·cm$^{-3}$. The packed bed was 0.15 m long and had on internal cross sectional area of 5.67 cm$^2$. The column was operated at 107 kPa with a water flow of 1.9 kg·m$^{-2}$·s$^{-1}$ and exchange rates were measured at 25°, 45° and 65° C.

The results at 25° C. are shown in FIG. 3 as a function of hydrogen flow. The $K_y a$ value designated ●, for this very active catalyst is almost independent of gas flow rate and this behaviour is typical of the data obtained at the higher temperatures. The low dependence on hydrogen gas flow indicated that $K_y a$ is being limited at the various temperatures by the catalytic rate. The measured catalytic rate, $\rho k_R$ designated ■, is essentially independent of the hydrogen gas flow; the measured rate is much higher than those obtained earlier with Pt-C-Teflon catalysts on ceramic spheres and reported in the applicants' earlier U.S. Pat. No. 4,126,667. The rate of the vapour-liquid transfer reaction, $\rho k_D$, designated ○, that takes place on the wet cotton surface is extremely fast, in fact, it is 3.8 times faster than normally observed for ceramic spheres. This transfer rate increases as the 0.46 power of the gas flow. Because $\rho k_D$ is very high the measured values are less precise than usual and this is particularly true for the lower flow rates.

The results obtained at the higher temperatures are summarized in Table I for a hydrogen gas flow rate of 0.5 m·s$^{-1}$ (STP).

TABLE I

| | Transfer Rates for the Ordered Bed Catalyst, CA21 | | |
|---|---|---|---|
| Temp. °C. | $K_y a$ m$^3$(STP)·s$^{-1}$·m$^{-3}$ | $\rho k_R$ mol·s$^{-1}$·m$^{-3}$ | $\rho k_D$ mol·s$^{-1}$·m$^{-3}$ |
| 25.0 | 3.10 | 62 | 95 |
| 45.0 | 5.00 | 123 | 171 |
| 65.0 | 7.06 | 171 | 300 |

The value of $\rho k_D$ given in the Table I at 65° C. is only approximate because the extremely high transfer rate makes precision measurements difficult. Both $\rho k_R$ and $\rho k_D$ have a temperature coefficient equivalent to an activation energy of 24 kJ·mol$^{-1}$ which is comparable to values observed for the previously mentioned catalyst on ceramic spheres.

(g) Effect of Platinum Loading

A number of catalyst packing modules according to the present invention were prepared with different Pt loadings by electrostatically spraying an aqueous dispersion of platinized carbon and Teflon onto the surface of corrugated, 304 stainless steel open mesh cloth (28×28 mesh, wire diameter 0.19 mm). The catalytic Pt-C-Teflon layer was deposited in multiple coats with infrared heat lamp drying between applications. Most catalysts were prepared on open mesh cloth with medium corrugations, 4.0 mm apart and 2.7 mm high (medium corrugations). The platinized carbon used contained 9.1% by weight Pt dispersed on the high surface area carbon. The resulting catalysts were slowly dried in air over 25 hours at gradually increasing temperatures from 60° to 200° C. The slow drying was necessary to prevent burning of the catalyst by the too rapid removal of the emulsifying agent Triton (Trademark). The catalysts which had a Teflon-to-platinized carbon weight ratio of 3.0 were finally cured by heating in air at 365° C. for 15 minutes. The catalysts were then rolled with a layer of cotton cloth into right cylinders 0.10 m in height to give the "jelly roll" configuration. These modules were designed to fit smoothly into a 5.59 cm diameter glass column used for testing catalyst performance. It should be noted that in other embodiments the Pt-C-Teflon catalyst could be deposited on corrugated, nickel coated steel open mesh cloth, which is about one third of the cost of stainless steel or on aluminum open mesh cloth which is also much cheaper.

The activities of catalysts, according to the present invention, with various platinum loadings were measured in a trickle bed reactor (0.10 m×24.3 cm$^2$) using the water distributor previously described. Measurements were made at 25° C. with a water flow of 0.83 kg·m$^{-2}$·s$^{-1}$, and for all catalyst studied, $K_y a$, varied only slightly with the hydrogen gas flow rate. The steady values of the catalytic activity, observed on the second or third day of operation are plotted as a function of the platinum concentration, mg·cm$^3$ (of bed) are shown in FIG. 4 for a hydrogen flow rate of 0.50 m·s$^{-1}$ (STP) and at pressure of about 106 kPa.

Although $K_y a$ for a given catalyst bed can be measured with a precison of ±1%, the error on duplication of the beds is estimated at ±10%. The solid line in FIG. 4 has been fitted to the data, using the relationship $$\frac{1}{K_y a} = \frac{44.616}{a_R} \left[ \frac{1}{\rho k_R} + \frac{1}{a_D \rho k_D} \right] \quad (8)$$

which relates the overall transfer rate, $K_y a$, to the catalytic and vapour-liquid transfer rates. In calculating the fitted curve, the vapour-liquid transfer rate, $\rho k_R$, was taken equal to the observed rate, 95 mol·s$^{-1}$·m$^{-3}$, given in Table I and the catalytic rate $\rho k_R$, was assumed to be directly proportional to the platinum concentration in the packed bed, having a value of 42.7±3.5 mol·s$^{-1}$·m$^{-3}$ for the platinum concentration of 1.0 mg·cm$^{-3}$. The data are in reasonable agreement with the fitted curve considering the ±10% uncertainty in the duplication of these rather short catalyst beds. The agreement between the measured and the calculated values at the highest platinum loading (2.3 mg·cm$^{-3}$) indicate that the increased layer thickness of this heavily loaded catalyst causes no appreciable reduction in the specific value of $\rho k_R$ (mol·s$^{-1}$·kg$^{-1}$ (Pt)) and that the variation of $K_y a$ with metal loading is well accounted for by the model using the two separated rates.

(h) Effect of Column Length

The effect of column length and the non-contacting of catalyst packing modules on the activity of the catalyst was also investigated. The activity of a 0.31 m long catalyst column consisting of three 0.10 m catalyst packing modules stacked together was measured under the same operating conditions as outlined in the section above. The $K_y a$ of the 0.30 m catalyst bed was 9% higher than that observed for the 0.10 m bed. Although the activity of the shorter column should have been about 3% higher than the longer because of an end effect, the agreement is within the expected error ±10% on duplication of catalysts beds. The 0.30 m column was also operated with 2 cm spacing between the catalyst packing modules and for this condition there was no change (<2%) in $K_y a$. These results demonstrate that there is no appreciable effect on $K_y a$ with column length and that water distribution between catalyst packing modules is adequate. Because the water wicks off a catalyst packing module, according to the present invention, (or drips off when a space exists) uniformly over the entire cross sectional area, a given catalyst packing element acts as a good water distributor for the next catalyst packing module in the stack.

(i) Effect of Corrugation Size

Besides preparing catalysts on stainless steel open mesh cloth with corrugations 4.0 mm apart and 2.7 mm high (medium corrugation) one was fabricated using a corrugation size of 6.1×3.2 mm (coarse corrugation). The activity of the catalyst with coarse corrugation was 78% of that observed with medium corrugation for the same concentration of platinum per cm$^3$ of bed. This reduction in activity is exactly accountable by the reduction in geometric surface area of the catalyst layer in the ordered bed.

(j) Effect of Different Hydrophilic Materials

The activity of a Pt-C-Teflon catalyst on stainless steel open mesh cloth with medium corrugations was measured using various materials for the plane sheet in the jelly roll module. The same corrugated catalyst sheet was used in all these measurements and the platinum concentration in the ordered beds was 1.57 mg·cm$^{-3}$. The activities observed for the ordered beds with different hydrophilic materials are summarized in Table II for measurements at 25° C. with a hydrogen flow rate of 0.50 m·s$^{-1}$ (STP).

TABLE II

| Effect of Different Hydrophilic Material | | |
|---|---|---|
| Plane Strip | $K_y a$ m$^3$·s$^{-1}$·m$^{-3}$(STP) | Relative $K_y a$ |
| Cotton | 2.80 | 1.00 |
| Nylon | 1.21 | 0.43 |
| Nylon (treated) | 2.65 | 0.95 |
| Fibreglass (treated) | 2.65 | 0.95 |
| Steel Screening (treated) (50 × 50 mesh) | 2.25 | 0.80 |

Although the catalyst packing module using nylon cloth only had 43% of the activity observed with cotton, after treatment with 3 mol·L$^{-1}$ NaOH to make the nylon hydrophilic their activities were equivalent. Treated fibreglass (heated to 500° C.) also produced an ordered bed catalyst of the same activity. An ordered bed using stainless steel cloth, pretreated by heating to 500° C., as the hydrophilic packing was 20% less active.

Although various materials having a wicking action for liquid water may be successfully used as the plane strip component in ordered bed catalysts, both cotton and fibreglass are preferred choices for various reasons, including their cheapness, strength and hydrophilic character. In long lifetime tests cotton has proven to be completely stable and unaffected by the continuous presence of water

(k) Comparison with Catalysts on Ceramic Spheres

The activity of the ordered bed catalyst, using catalyst packing modules according to the present invention are compared in Table III with catalysts on both large and small ceramic spheres. The superior performance of the ordered bed configuration is clearly demonstrated.

TABLE III

| Comparison of Spherical and Ordered Bed Catalysts | | | |
|---|---|---|---|
| Catalyst No. | LPCE-1 | T86A | CA30 |
| Carrier | 6.7 mm spheres | 4.6 mm spheres | Ord. Bed |
| % Pt | 0.178 | 0.153 | 0.35 |
| Pt Conc. - mg·cm$^{-3}$ | 0.93 | 0.98 | 1.38 |
| $K_y a$ - m$^3$(STP)·s$^{-1}$·m$^{-3}$ | 0.73 | 1.21 | 2.98 |
| Rel. $K_y a$ | 1.00 | 1.65 | 4.06 |
| $K_y a^*$ - m$^3$(STP)·s$^{-1}$·kg$^{-1}$(Pt) | 0.79 | 1.24 | 2.16 |
| Rel. $K_y a^*$ | 1.00 | 1.57 | 2.73 |

The measurements were made in a 0.30 m column at 25° C. with a hydrogen flow rate of 0.50 m·s$^{-1}$ (STP) and L/G=2.0. The activities recorded were obtained in 7.0 or 5.6 cm diameter columns and are the steady values observed after several days of continuous operation. Both the activity and the specific activity, $K_ya^*$—$m^3 \cdot s^{-1} \cdot kg^{-1}$(Pt), of the catalyst on the small spheres are about 60% higher than the catalyst on large spheres, LPCE-1. The ordered bed catalyst is much more active, with $K_ya$ and $K_ya^*$ being respectively 4.1 and 2.7 times greater than the LPCE-1 catalyst. The higher performance of the ordered bed catalyst results from increasing both the geometric surface area of the catalyst layer per unit bed volume and the surface area for the vapour-liquid transfer reaction. Besides being more active, the ordered bed catalyst has the additional advantage that it can operate at much higher gas and liquid flow rates without flooding. Further, the activity of the ordered bed catalyst is nearly independent of hydrogen flow in the range 0.15-1.3 $m \cdot s^{-1}$ (STP) and so there is no loss in performance if it is desired to operate the column at low gas velocities in order to decrease the height of a transfer unit, HTU, and thus decrease the height of the exchange column.

MODIFICATIONS FOR IMPROVED PERFORMANCE

In FIGS. 5 to 7, similar parts to those shown in FIG. 1 are designed by the same reference numerals and the previous description is relied upon to describe them.

The performance of the ordered bed catalysts according to this invention can be improved and modified in several ways.

As shown in FIG. 5 the open mesh metal cloth supporting the hydrophobic catalyst can be corrugated to provide corrugations such as 6 which extend along paths which are inclined downwardly at some acute angle α, to the central vertical plane of the module. Inclining the corrugations will increase the turbulence in the hydrogen-water vapour gas phase flowing upward through the packed bed, thereby increasing the overall deuterium transfer rate. Alternate modules in a downward direction in the packed column preferably have the corrugations inclined downwardly at the same acute angle, α, to the left and then to the right of the central vertical plane of the modules in order to improve horizontal mixing and to maintain uniform gas flow. In this configuration the unobstructed fluid passages extend downwardly in a zig-zag fashion.

Serrating the bottom edge of the hydrophilic plane sheet 2, together with an upper edge that is substantially even, would provide uniformly distributed drip or wick points of the liquid water flowing downward through ordered bed modules as illustrated in FIG. 5 at 14. By allowing these to protrude slightly below each catalyst packing module, good physical contact is achieved with the module directly below thereby further ensuring good horizongal distribution of the liquid water. This refinement also will help to prevent any possible buildup of bulk liquid water at the interface of packing modules which could cause flooding of the column.

In FIG. 6 the corrugated sheet 4 is one of a plurality of similar corrugated sheets, the others being designated 16 to 19. The corrugated sheets 4, 16 to 19 are placed side by side and coiled with a single plane band width of the plane sheet 2 so that the whole of the band width of the plane sheet 2 has corrugated sheets (4, 16 to 19) coiled therewith. It will be appreciated that the corrugations 6 of the corrugated sheets 4, 16 to 19 may incline downwardly as shown in FIG. 5 with the inclinations of successive corrugated sheets oppositely inclined so that the unobstructed fluid passages extend downwardly in zig-zag fashion.

In any of the previous embodiments of the present invention the plane sheet 2 may be provided with substantially uniformly spaced small holes 26 (FIG. 6) about 3 mm in diameter In FIG. 7 the plane sheet 2 is one of a plurality of similar plane sheets, the others being designated 20 to 23. The plane sheets 2, 20 to 23 are coiled with successive band widths of the corrugated sheets 4, 16 to 19 and the adjacent plane sheets 2, 20 to 23 have marginal, overlapping edge portions such as 24 and 25 for plane sheets 2 and 20 respectively.

A further modification in this embodiment is the addition of substantially uniformly spaces small holes 28 about 3 mm in diameter in the plane sheet 2 or plane sheets 2 and 20 to 23 to improve the horizontal mixing of the gas phase.

OTHER APPLICATIONS OF ORDERED BED PACKINGS

The ordered bed packing arrangement according to the present invention can be employed to great advantage for many gas-liquid transfer reactions used in industry. For these non-catalytic applications, the corrugated open mesh metal cloth functions as a spacer and support for the plane hydrophilic sheet and enhances the turbulence in the gas phase. The corrugated metal cloth is made hydrophobic with some suitable polymeric material such as polytetrafluoroethylene, polyethylene, polystyrene, polymethylmethacrylate or polypropylene or conversely the spacers are made of some open mesh hydrophobic material. Such ordered bed packing modules have gas-liquid transfer rates that are about 3 times faster than have been measured for rough hydrophilic ceramic spheres and about 5 times faster than those obtained with Berl* and Intalox* saddles. The greatly enhanced gas-liquid transfer rates for the ordered bed packing modules in the present invention results from the much higher geometric surfaces area per unit of bed volume obtained with the tight packing arrangement and more uniform wetting of the plane hydrophilic sheets. Although the packing arrangement is tight, less than 3 mm between successive hydrophilic layers, high gas and liquid flows can be used without flooding of the packing because the hydrophilic surfaces are separated by hydrophobic spacers and because the hydrophilic surfaces have a wicking action. These two factors prevent bulk liquid forming in the small gas channels running through the packing module.

*Trademark

The ordered bed modules can be made from low cost materials and large modules can easily be fabricated for insertion into any reasonable diameter column. Although only small ordered bed modules have been operated it would not be difficult to design a support structure to allow the use of much larger modules. A supporting grid either inserted through the packing unit horizontally or spread out from the bottom of a central vertical rod would be sufficient to maintain the rolled configuration and support the inherently low weight of the packing with its liquid hold-up. Increasing the length of each module is also not difficult and makes it easier to maintain good water distribution throughout the packed column.

The ordered bed catalyst modules according to the present invention can also be employed for other catalytic reactions, such as the recombination of hydrogen isotopes and oxygen which is a reaction of importance in safety equipment associated with nuclear power reactors and tritium handling facilities. Catalysts such as Pt or Ni on alumina, or on silica are deposited onto the corrugated open mesh metal screening in a porous matrix of polytetrafluoroethylene or conversely the platinum crystallites are dispersed in the porous polytetrafluoroethylene layer itself without the alumina or silica support material. The recirculating liquid water flowing in the packing module would remove the heat of the recombination reaction. In large tritium handling facilities these recombination ordered bed catalysts could be used for the recovery of tritium from waste gas streams.

We claim:

1. An ordered bed packing module for gas-liquid transfer reactions, comprising, alternate layers of plane and corrugated sheets coiled together to form a roll, with the corrugations extending along an axis about which the layers have been coiled together and providing unobstructed fluid passages between the plane and corrugated sheets, and wherein the plane sheet comprises woven, knitted or felted cloth of a textile, wicking material which will provide an uninterrupted wicking path, between the ends of the roll, for the said liquid, and the corrugated sheet comprises an open mesh material with at least an outer surface layer consisting of a high molecular weight, organic, polymeric substance which will be inherently hydrophobic with respect to the said liquid.

2. An ordered bed catalytic packing module for the combination of both catalytic and gas-liquid transfer reactions comprising, alternate layers of plane and corrugated sheets coiled together to form a roll, with the corrugations extending along an axis about which the layers have been coiled together and providing unobstructed fluid passages between the plane and corrugated sheets, and wherein the plane sheet is of a woven, knitted or felted cloth of a textile, wicking material which will provide an uninterrupted wicking path, between the ends of the roll, for the said liquid, and which will be substantially catalytically inactive with respect to the said gas and the said liquid, and the corrugated sheet comprises an open mesh carrier, and an outer surface layer on the mesh, the outer surface layer comprising a porous matrix of a high molecular weight, organic polymeric substance which will be inherently hydrophobic with respect to the said liquid, and catalyst crystallites of at least one element selected from group VIII of the Periodic Table, the crystallites being dispersed in the porous matrix and partially enclosed thereby so that the porous matrix will substantially inhibit the contact of liquid water with the crystallites while allowing contact therewith of the said gas and the said liquid in vapour form.

3. A module according to claim 2 wherein the high molecular weight, organic, polymeric substance is polytetrafluoroethylene and the catalyst consists of platinum crystallites supported on high surface area carbon particles and these partially plantinized carbon particles are dispersed in the porous matrix.

4. A packing module according to claims 1 or 2, wherein the hydrophilic plane sheet has an upper edge that is substantially even and a lower edge that is serrated or pinked.

5. A packing module according to claim 1 or 2, wherei the hydrophilic plane sheet is of a material selected from the group consisting of cotton and fibreglass.

6. A packing module according to claims 1 or 2, wherein the corrugated sheet is one of a plurality of similar corrugated sheets placed side by side and coiled with a single band width of the plane sheet so that the whole of the band width of the plane strip has a number of corrugated sheets coiled therewith.

7. A packing module according to claims 1 or 2, wherein the plane sheet is one of a plurality of similar plane sheets coiled with a successive band widths of the corrugated sheets, and the adjacent plane sheets have marginal, overlapping edge portions.

* * * * *